United States Patent
Day et al.

(10) Patent No.: US 6,296,794 B1
(45) Date of Patent: Oct. 2, 2001

(54) PRESSED POROUS FILTER BODIES

(75) Inventors: J. Paul Day; David L. Hickman, both of Big Flats; Lawrence S. Rajnik, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/413,427

(22) Filed: Oct. 6, 1999

Related U.S. Application Data

(60) Provisional application No. 60/103,496, filed on Oct. 8, 1998.

(51) Int. Cl.[7] ............................. B01D 39/20; B28B 3/00
(52) U.S. Cl. ..................... 264/109; 264/628; 264/630; 264/122; 264/125; 264/DIG. 48
(58) Field of Search ...................... 264/109, 628, 264/629, 630, 631, 122, 338, 125, DIG. 48

(56) References Cited

U.S. PATENT DOCUMENTS

| | | |
|---|---|---|
| 2,734,843 | 2/1956 | Steele . |
| 2,819,209 | 1/1958 | Pall et al. . |
| 3,226,460 | 12/1965 | Dietzsch . |
| 3,788,486 | 1/1974 | Bergstrom . |
| 4,283,210 * | 8/1981 | Mochida et al. ............ 264/DIG. 48 |
| 4,329,162 | 5/1982 | Pitcher, Jr. . |
| 4,557,773 * | 12/1985 | Bonzo ................................ 264/273 |
| 4,662,911 | 5/1987 | Hirayama et al. . |
| 4,818,744 | 4/1989 | Berger et al. . |
| 4,853,170 * | 8/1989 | Buhler et al. ....................... 264/109 |
| 5,021,204 * | 6/1991 | Frost et al. ........................ 264/264 |
| 5,066,432 | 11/1991 | Gabathuler et al. . |
| 5,098,455 * | 3/1992 | Doty et al. ........................... 55/523 |
| 5,256,360 * | 10/1993 | Li ..................................... 264/DIG. 48 |
| 6,004,495 * | 12/1999 | Keibel ........................... 264/DIG. 48 |

FOREIGN PATENT DOCUMENTS

| | | |
|---|---|---|
| 2 248 359 | 4/1973 | (DE) . |
| 2 210 438 | 9/1973 | (DE) . |
| 0 345 381 | 12/1989 | (EP) . |
| 0 745 416 | 12/1996 | (EP) . |

* cited by examiner

*Primary Examiner*—Mathieu D. Vargot
(74) *Attorney, Agent, or Firm*—Kees van der Sterre

(57) ABSTRACT

A preform for a z-flow honeycomb filter is formed by a pressing process wherein a batch charge is shaped in a press into a preform of finished plug-and-channel configuration, the shaped preform comprising opposing overlapping arrays of closed-end inlet and outlet channels wherein the end closures consist of bridging segments of batch material connected in continuous (seamless) or uninterrupted fashion with the adjoining channel walls.

7 Claims, 4 Drawing Sheets

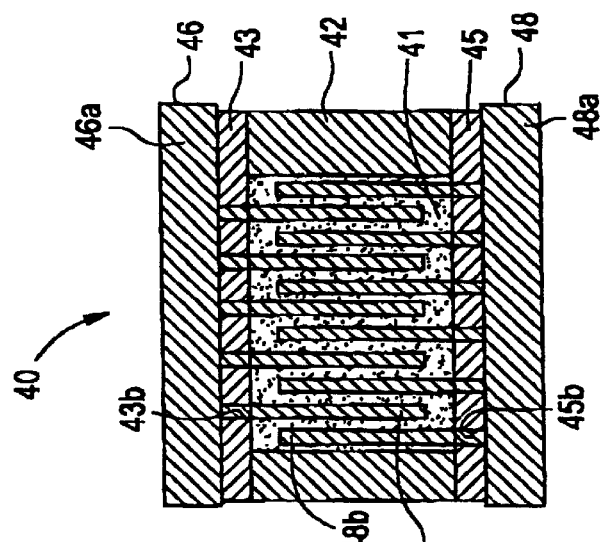
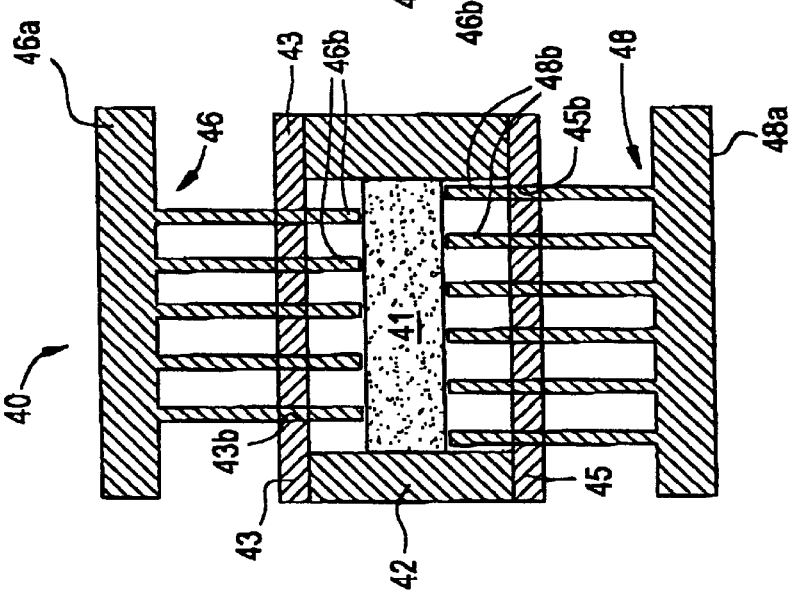
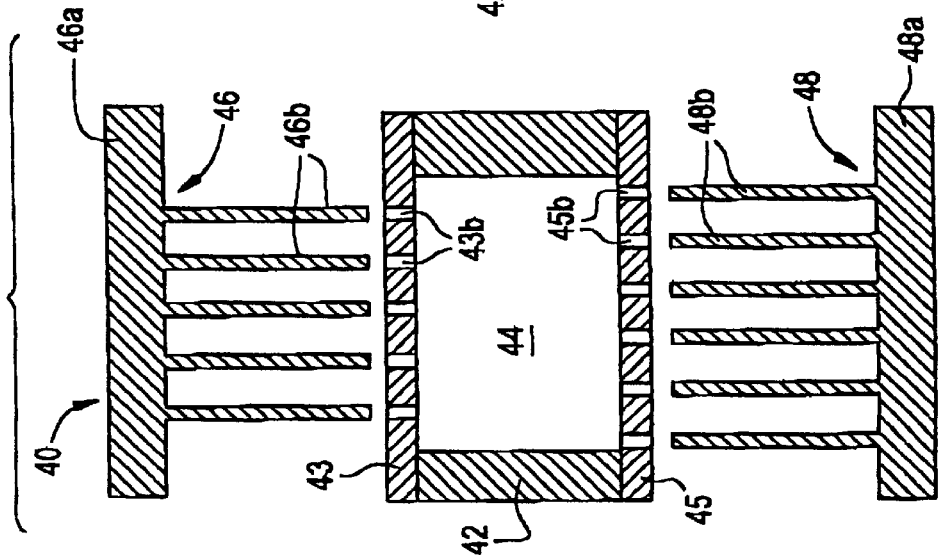

PRESSED POROUS FILTER BODIES

This application claims the benefit of U.S. Provisional Application No. 60/103,496, filed Oct. 8, 1998, entitled "Pressed Porous Filter Bodies", by Day et al.

BACKGROUND OF THE INVENTION

The present invention relates to filtering apparatus and more particularly to compact porous monolithic filter bodies useful, for example, for the efficient purification of drinking water.

Many filter designs for the removal of unwanted impurities from drinking water supplies are known. These include the increasingly common water carafe filters, commercially sold as replaceable filter cartridges for drinking water carafes at relatively low cost. These filters are reasonably effective for the removal of unwanted tastes, odors, and harmful pollutants from drinking water.

Replaceable filter cartridges of these types are typically packed-bed units containing carbon pellets for the removal of adsorbable/catalyzable constituents such as chlorine and organics. Also included are ion exchange resins for the removal of metal ions such as lead, and in some cases bacteriostatic agents such as silver to inhibit the growth of harmful bacteria.

Although gaining in acceptance, filters designed for use in replaceable cartridge filtration systems suffer from a number of disadvantages. Packed bed systems typically develop preferential flowpaths within the bed, resulting in less than optimal use of the available adsorbents and exchange media and correspondingly decreased purifying effectiveness and service life. Packed beds also tend to release fine adsorbent particles into the treated water during initial use.

Also limiting the utility of these systems is water filtration rate. In general, gravity-assisted water flow rates through these filters are not high. For this reason alone, the use of more tightly packed, higher-efficiency filtration media is not commercially acceptable.

Fluid filtration elements comprising plugged honeycomb filters are well known in the art. U.S. Pat. No. 4,329,162 and published European patent application EP 0745416, for example, describe the use of such filter elements for the removal of particulates from vapor, water and other fluid streams. One disadvantage of these filter elements, however, is cost. The porous ceramic honeycombs used in these filter designs to support carbon adsorbents and provide wall filtration are relatively expensive. Further, manufacturing processes for infiltrating the ceramics with adsorbents and/or other active filtering materials are somewhat elaborate and time-consuming, as are present methods for plugging of the honeycombs to define effective filtration flowpaths through the honeycomb walls.

A number of attempts to decrease the cost and/or increase the efficiency of these honeycomb structures have been made. U.S. Pat. No. 5,006,432, for example, describes a method of making a plugged honeycomb (or "z-flow") filter by first machining a block of open-pore plastic foam to form a filter preform, then infiltrating the preform with a ceramic slurry, and finally heating the filled form to oxidize the foam and sinter the ceramic into a porous honeycomb filter. U.S. Pat. No. 3,788,486 describes pressed or machined porous z-flow filter of similar design for use in filtering molten thermoplastics, while U.S. Pat. No. 2,819,209 describes a pressed fluoropolymer filter for caustic or acidic liquid filtration.

Honeycomb structures for other applications have also been formed by pressing. Thus U.S. Pat. Nos. 2,734,843 and 3,226,460 describe pressing processes and apparatus for the continuous production of lengths of honeycomb core material for the fabrication of reinforced composite structures. These structures are not, however, designed for liquid filtration.

Unfortunately, none of the various alternative methods for making elements of honeycomb structure for use as fluid filters have proven adaptable for the economic commercial production of filters for drinking water purification in large volumes. One particular problem not solved by prior art methods arises from the nature of some of the materials used for the manufacture of these elements. In the case of preforms for activated carbon filters, for example, carbon precursors including phenolic resins or other carbon-yielding organic species can be present which impart a sticky quality to the pressing batch. It is difficult to form thin-walled honeycomb structures from batches containing such precursors, because the thin-walled structures are quite susceptible to damage in the course of separation of the batch material from conventional metal or other forming surfaces.

SUMMARY OF THE INVENTION

The present invention provides an economical yet effective pressing process for the production of preforms for porous filter bodies of the type useful for fluid filters. Manufacture can be effected at sufficiently low cost to provide an economic filter element in a system such as a replaceable water purification filter cartridge.

The preforms are pressed from mixtures of powders with appropriate binders, and optionally precursors for supplemental filter constituents such as activated carbon. Prior to pressing the mixtures are blended and worked into plasticized powder batches having compositions which can be converted after pressing to porous filter materials, using suitable post-forming treatments such as polymerization or sintering heat treatments.

The pressed preforms provided in accordance with the invention are for filters of z-flow filter design. Such filters generally comprise an entrance face, a discharge face, a plurality of elongated inlet channels opening on the entrance face and extending into the body toward the discharge face, and a plurality of elongated outlet channels, offset from the inlet channels, opening on the discharge face and extending into the body toward the entrance face.

In the preforms of the invention, the discharge channels are parallel with but separated from the inlet channels by thin channel walls of the plasticized powder batch material, the inlet channels extending past or overlapping the discharge channels over most of the lengths of each. Further, in the typical preform design, each inlet channel is closed at the discharge face by an end segment of plasticized batch material continuously connecting with the channel walls for the inlet channels, while each discharge channel is similarly closed at the inlet face of the preform by a segment of batch material similarly integrated with the adjacent wall structure.

An alternative preform structure is a pressed preform comprising a structural element or sub-unit for a z-flow filter which includes a first channel array of channels closed at a first face of the structure and a second array of channels opening on both faces, i.e. completely traversing the preform shape. Two of these structural elements may then be combined to provide a completed z-flow filter or filter preform comprising two sets of oppositely closed channels identical to the typical preform design.

The method of making a channeled honeycomb filter preform in accordance with the invention comprises the initial step of introducing a charge of the plasticized powder batch material into a suitable pressing chamber. The pressing chamber includes a sidewall member and at least first and second opposing pressing elements for forming channels in the batch charge. The pressing elements include first and second base plates supporting, respectively, first and second arrays of channel-forming members attached to and extending generally perpendicularly from the base plates, each array extending toward the other when the chamber is open.

To press the preform into the desired configuration, the sidewall member and opposing first and second pressing elements are brought into contact with each other and with the charge of batch material, and the pressing elements are advanced toward each other to close the pressing chamber. Within the closed chamber, the channel-forming members of the first pressing element extend from the first base plate through the batch charge toward the second base plate, being separated from the second plate by a first interval, while the channel-forming members of the second pressing element extend from the second base plate toward the first base plate but are separated therefrom by a second interval.

The channel-forming members of the first base plate are generally parallel with but laterally offset from the channel-forming members of the second base plate, the interval between the members being filled with the batch material and defining the channel wall thickness of the preform. The intervals separating the pin ends from the opposing base plates are also filled with batch material, these intervals defining the thicknesses of the end segments closing the ends of the respective channels.

After completion of the pressing step, the pressing chamber is opened and the pressed shape removed for inspection and further processing. Typically, the shape is a honeycomb filter preform incorporating opposing, overlapping arrays of channels separated by channel walls of the batch material, each channel having an open end and a closed end and the closed end being bounded by an end segment of plasticized powder batch material continuous with the channel walls.

Preforms produced as above described normally require further treatment to develop a selected level of porosity in the wall and end segment sections of the preform. Examples of such treatments include curing or sintering heat treatments, during which organic binder or precursor components of the batch may be expelled or converted to permanent filter components. At the same time, powders present in the batch may be sintered to form part of the filtering framework, or vaporized to contribute to residual wall porosity.

The product of such curing and/or sintering treatments is a porous honeycomb filter body of controlled channel and wall dimensions having the added advantage that the closed ends of the channels are formed, not by subsequently formed plugging materials, but by segments of porous wall material continuously extending over the closed ends, as well as integrally formed with and identical in composition and porosity to the adjoining channel walls.

DESCRIPTION OF THE DRAWINGS

The invention may be further understood from the drawings, wherein:

FIGS. 4–6 show a further embodiment of pressing apparatus for forming a pressed honeycomb filter preform in accordance with the invention;

DETAILED DESCRIPTION

The use of a pressing procedure rather than an extrusion and plugging procedure for the fabrication of a plugged honeycomb or z-flow filter preform in accordance with the invention offers a number of advantages, particularly for preforms of relatively short channel length. Pressing generally permits better shape retention than conventional extrusion processes, if the parts are small, and much better utilization is made of expensive batch materials, since the plugs can be relatively thin. Further, the pressing process advantageously develops plugging end segments which are continuous with and of the same composition and porosity as the wall material.

Thin plugs are difficult to form repeatedly using known honeycomb plugging processes, yet are absolutely necessary in short honeycombs where the sidewall surface area available for active filtration within the channels is at a premium. The invention largely avoids the loss of filter surface area accompanying the use of impermeable polymer or sintered metal or ceramic plugs, by providing plugs of a thickness, composition and porosity essentially equivalent to those of the sidewalls of the filter.

The risk of plug dislodgment in these pressed filter preforms is generally decreased due to the continuous and integral nature of the preform structure. That is, the transitional joint normally present at the channel/plug interface in conventionally plugged honeycombs is absent in the pressed honeycomb preforms hereinafter describe, since the channel end segments forming the plugs are continuous with and substantially identical in composition and microstructure with adjoining channel wall sections.

Figure 1:
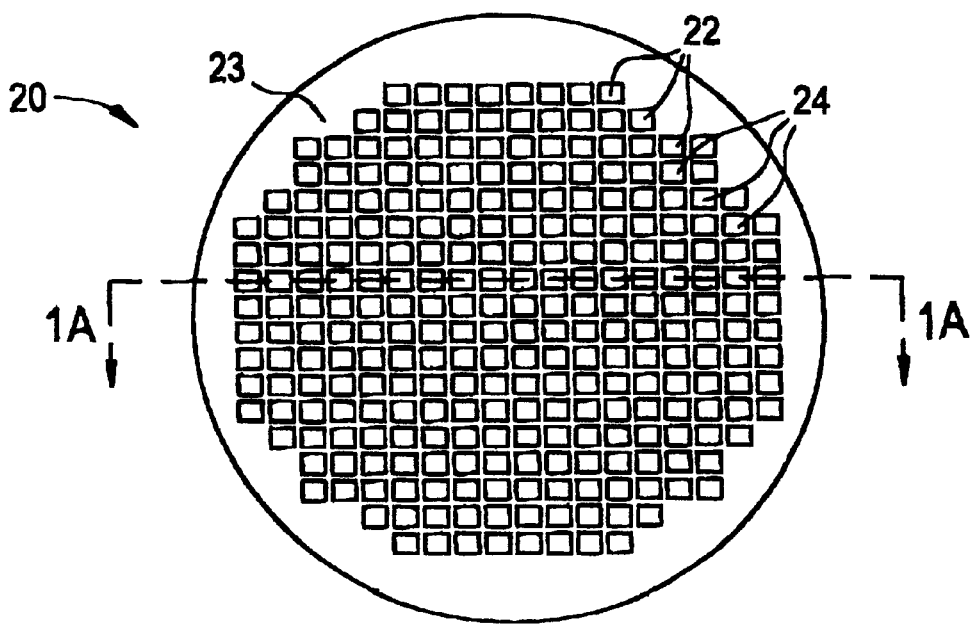
FIGS. 1–1a schematically illustrate a pressed liquid filter preform provided in accordance with the method of the invention.
Figure 1A:
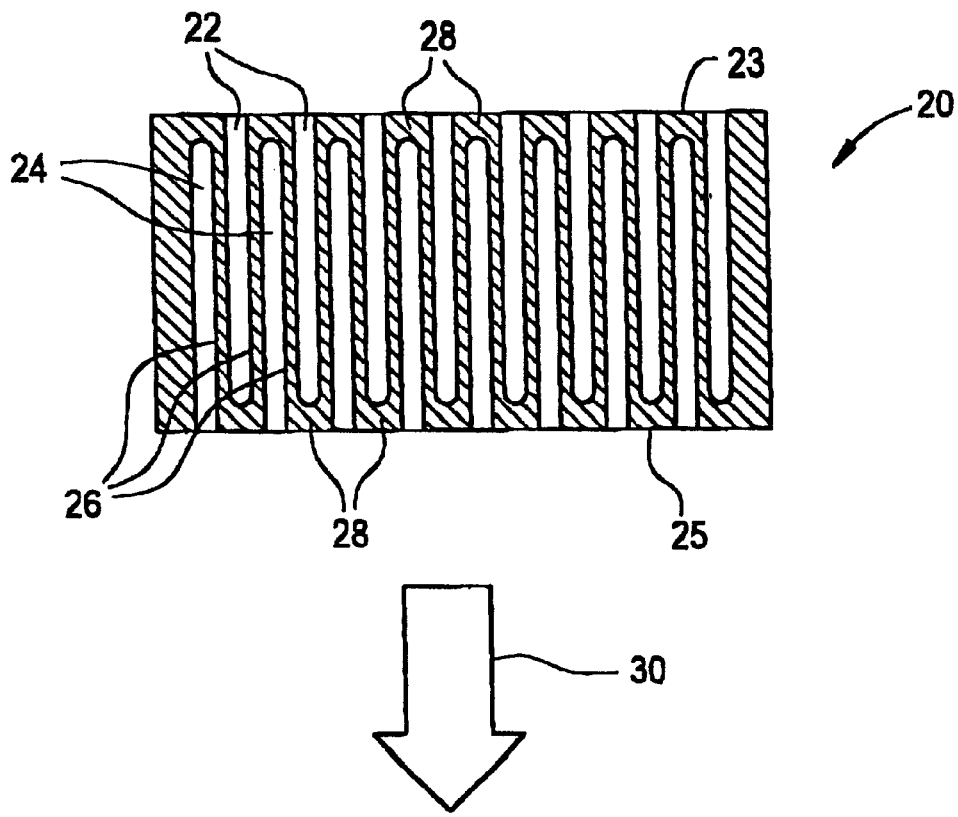

A representative example of a pressed filter design provided in accordance with the invention is schematically illustrated in FIGS. 1–1a of the drawing. FIG. 1 is a top plan view of such a filter 20 showing the disposition of inlet channels 22 on inlet surface 23 of the filter body. Discharge channels 24 (shown in phantom) are not open on inlet surface 23 but open onto outlet surface 25 of the filter as shown in the cross-sectional side elevational view presented in FIG. 1a. Thus liquid flowing through filter 20 in the direction of arrow 30 must traverse channel walls 26 and channel end segments 28 of the filter.

For most water filtration applications, particularly if involving only gravity feed for the influent water, the honeycomb cell density and channel wall thickness must be carefully controlled. In general, cartridges for water filters should have cell densities, in channels per square inch of filter cross-section perpendicular to the channel axes, of at least about 50 cells/in2 and preferably at least 200 cells/in2. At the same time, channel wall thicknesses not exceeding about 0.050 inches, and preferably not exceeding about 0.020 inches, should be provided. Porous ceramic honeycombs of this geometry have previously been obtainable only through extrusion and plugging processes.

Another geometric characteristic of particular importance for water filtration systems certified for the removal of cysts or other biological contaminants in the water supply is that of uniform wall thickness. Thin wall sections, even if relatively isolated within the body of a filter, can permit biological contaminants to traverse the filter in concentrations well above those permitted by certifying regulations. Advantageously, the pressing methods of the invention enable the manufacture of filters and filter preforms wherein the channel walls have a variation in thickness not exceeding about 20% of the value, and more typically not exceeding more than about 10% of the value, of the average channel wall thickness for the filter preform.

An important advantage of the method of the invention is the degree of control over filter preform and final filter geometry which is obtained. For example, the thickness and configuration of the plugging channel end segments can be precisely controlled to meet specific requirements for particular filter applications. The elements may be thickened on one end of the filter body only, if useful to better resist high inlet pressures, or the shapes of all or selected ones of the plugging elements can be optimized for improved resistance to blowout.

Fundamental properties of the filter, such as geometric surface area and active filtration area, are readily adjusted by controlling the extent of channel overlap and the thickness of the plugging elements. The shapes and sizes of the channels and the thickness of the partitioning channel walls can also be adjusted, thus to provide different channel shapes, sizes and/or wall thickness in different portions of the filter preforms. In this way filters adapted in size, shape and filtration characteristics to any of a wide variety of filtration environments and applications can conveniently be designed and made.

Figure 2:
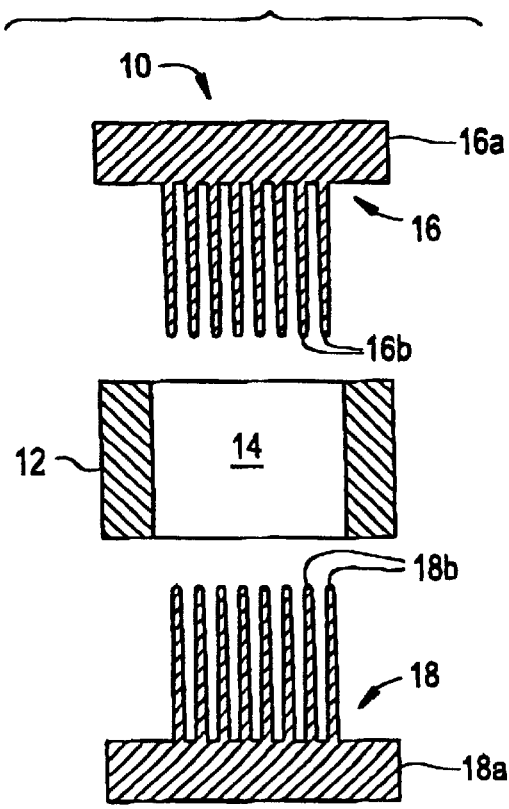
FIGS. 2–2a schematically illustrate pressing apparatus for forming a pressed honeycomb filter preform in accordance with the invention.
Figure 2A:
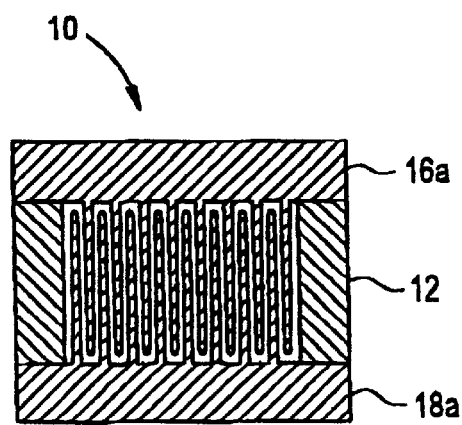

FIGS. 2–2a of the drawing illustrate apparatus useful for the pressing of honeycomb filter preforms in accordance with the invention. In the cross-sectional side elevational view of FIG. 2, pressing apparatus 10 includes a sidewall member 12 forming an open-ended molding chamber 14, and opposing first and second pressing elements 16 and 18, respectively, for closing ends of the chamber while shaping a charge of batch material disposed therein.

Pressing elements 16 and 18 shown in FIGS. 2–2a include first and second base plates 16a and 18a supporting first and second arrays of channel-forming members 16b and 18b, the channel-forming members in each case being attached to and extending generally perpendicularly from their respective base plates 16a and 18a. When both of pressing elements 16 and 18 are advanced into molding chamber 14 as shown in FIG. 2a, channel-forming members 16b of first pressing element 16 extend from first base plate 16a toward second base plate 18a, and members 18b extend toward first base plate 16a as shown. Thus, in the closed chamber, channel-forming members 16b and 18b of the two arrays are parallel with and extend past each other, and laterally offset from each other with a spacing which defines the channel wall thickness of the filter preform.

As further shown in FIG. 2a, the distal ends of the first array of channel-forming members 16b in the closed chamber are spaced away from the opposing second base plate 18a, and the ends of members 18b from first base plate 16a. This spacing defines the thickness of the end segment of powder batch material formed at each of the closed ends of the channels in the preform.

As the pressing chamber of FIGS. 2–2a is closed and the channel-forming members 16b and 18b advanced into a charge of plasticized batch material (not shown) disposed in the chamber, adjacent overlapping inlet and outlet channels will be formed in the batch charge. However, since channel-forming members 16b and 18b do not reach opposing base plates 18a and 16a even when pressing elements 16 and 18 are fully seated on side wall member 12, no through-channels are formed in the batch charge but instead plugging end segments of consistently controlled thickness may be formed.

The design of the apparatus shown in FIGS. 2–2a is particularly advantageous for the fabrication of filter preforms of very slight wall thickness and/or very high cell density, e.g., as needed for the manufacture of gravity-flow water filters. Where channel wall thicknesses of 0.020 inches or below and/or cell densities of 200 cells/in2 or more are needed, it can be difficult to withdraw the channel-forming members from the shaped preform without damaging the thin walls and uniform cell spacing produced during pressing.

This problem is solved in the apparatus of FIGS. 2–2a through the application of a slight taper to channel-forming members 16b and 18b. More particularly, channel-forming members 16b and 18b are shaped to decrease in at least one cross-sectional dimension from the tips or lead ends of the members (those first entering the batch charge) to the bases of the members at the points of attachment to their respective base plates 16a and 18a. This taper has the effect that, as withdrawal of the elements from the batch charge begins, an immediate separation of the tapered members from the pressed channel walls of the preform occurs. This separation greatly reduces the likelihood of damage to the preform through abrasion or adhesion during the withdrawal step.

A further difficulty which can arise in the course of fabricating filter preforms of high cell density relates to the deflection of channel-forming members of slight cross-section in the course of the pressing step. Such deflections most often arise from lateral forces exerted on the forming members as they act to redistribute the plastic batch material from a central batch charge location toward more peripheral sections of the pressing chamber.

Figure 3A:
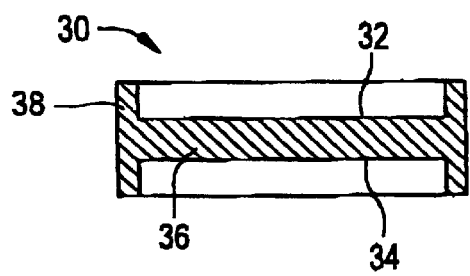
FIGS. 3–3a schematically illustrate a shaped charge for pressing honeycomb filter preform according to the invention.
Figure 3:
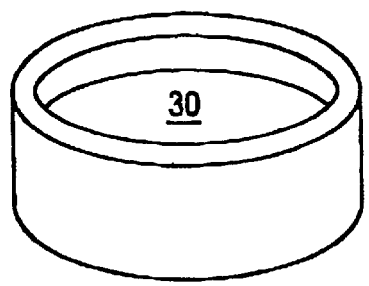

These deflections can be minimized or prevented through the use of a shaped charge of plasticized powder batch material for the pressing step. A particularly preferred shape is one wherein the charge has a generally flattened or disk configuration featuring at least partially flattened opposing major surfaces. An example of such a shaped batch charge is shown in FIGS. 3–3a of the drawing, FIG. 3 providing a schematic perspective view and FIG. 3a a schematic elevational cross-section thereof.

As shown in those Figures, batch charge 30 includes opposing surfaces 32 and 34 which define a charge volume including a central portion 36 of a first thickness and an adjoining edge portion 38 of a second thickness. Edge portion 38, which at least partially encircles central portion 36, supplies an increased volume of plasticized batch material to peripheral portions of the filter preform, without the need for lateral transport during pressing. In many filter designs, it is at these peripheral regions where increased volumes of batch material are needed to form a surface layer or skin on the filter preform.

Yet another approach to the pressing of honeycomb preforms of uniform thin wall structure involves the use modified pressing apparatus including supplemental "stripper" plates in combination with the pressing elements. An example of such modified apparatus is shown in FIGS. 4–6 of the drawings.

As shown in FIG. 4, apparatus 40 includes, for each of pressing elements 46 and 48, an associated stripper plate 43 and 45, respectively, each stripper plate comprising an array of perforations, 43b and 45b. These perforations are adapted to permit the passage of channel-forming members 46b and 48b, supported by their respective base plates 46a and 48a, into and out of pressing chamber 44 during each pressing cycle.

In the use of apparatus 40 as shown in FIGS. 5 and 6, sidewall member 42, opposing first and second stripper plates 43 and 45, and first and second arrays of channel-forming members 46b and 48b are brought into contact with each other to enclose a charge of plasticized batch material 41 within the pressing chamber. Pressing elements 46 and 48 are then advanced into the chamber as shown in FIG. 6 so that channel-forming members 46b of first pressing element 46 pass through perforations 43b in first stripper plate 43 and into batch material 41, extending toward but not contacting second stripper plate 45. At the same time, channel-forming members 48b of second pressing element 48 pass through perforations 45b in second stripper plate 45 and into batch material 41, extending toward but not contacting first stripper plate 43. Thus the charge of batch material is shaped into a honeycomb filter preform incorporating opposing, overlapping arrays of closed-end channels.

To remove the filter preform from the modified pressing apparatus with minimal damage to the pressed channel walls, the first and second pressing elements are retracted before the stripper plates and sidewall member are disassembled. Thus the arrays of channel-forming members are withdrawn from the preform through the perforations in the stripper plates, with the stripper plates acting to prevent the removal of batch material from the pressed channel walls. The sidewall member and stripper plates may then be opened and the filter preform readily removed.

Additional optional steps can be used to avoid the removal of material from, and/or other damage to, the channel walls in cases where the powder batch is particularly adherent to pressing surfaces. These include coating the pressing surfaces with permanent or temporary coatings of release materials, or treating the charge of pressing material within the pressing channel, by freezing, heating, irradiating, vibrating or the like, to increase preform coherence or promote press release prior to withdrawing the channel-forming elements from the pressing channel.

As previously noted, the filter pressing method of the invention may also be adapted to the production of structural sub-units for various z-flow filter designs. An example is a half-filter element comprising a first array of open channels distributed among a second array, equal in number, of closed channels. An example of such an element is shown in schematic elevational cross-section in FIG. 7 of the drawing, wherein filter preform 50 includes channels 52 open at both ends of the preform and channels 54 which include closing end segments 54a at only one end of the channels.

Joining a second element of this same configuration with the first element, with positioning of the elements so that the unplugged faces are in contact and the plugged channels in each communicate with the unplugged channels in the other, provides a z-flow filter or filter preform with twice the channel length of each element. Thus a filter preform longer than might otherwise be conveniently made by pressing procedures may readily be provided.

Figure 7:
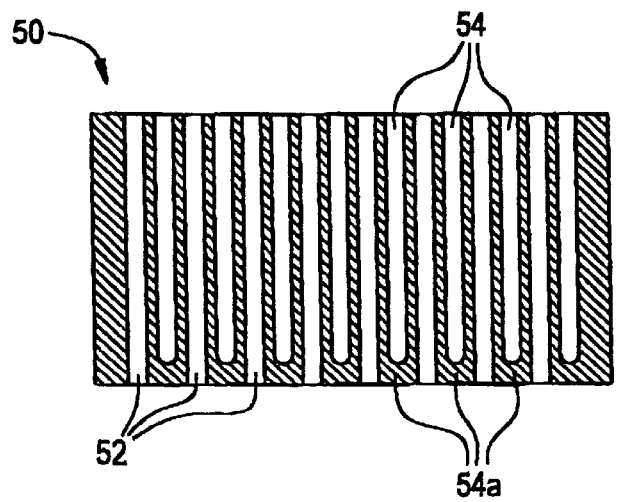
FIG. 7 schematically illustrates a pressed element useful for the assembly of a pressed liquid filter or filter preform in accordance with the invention.
Figure 8:
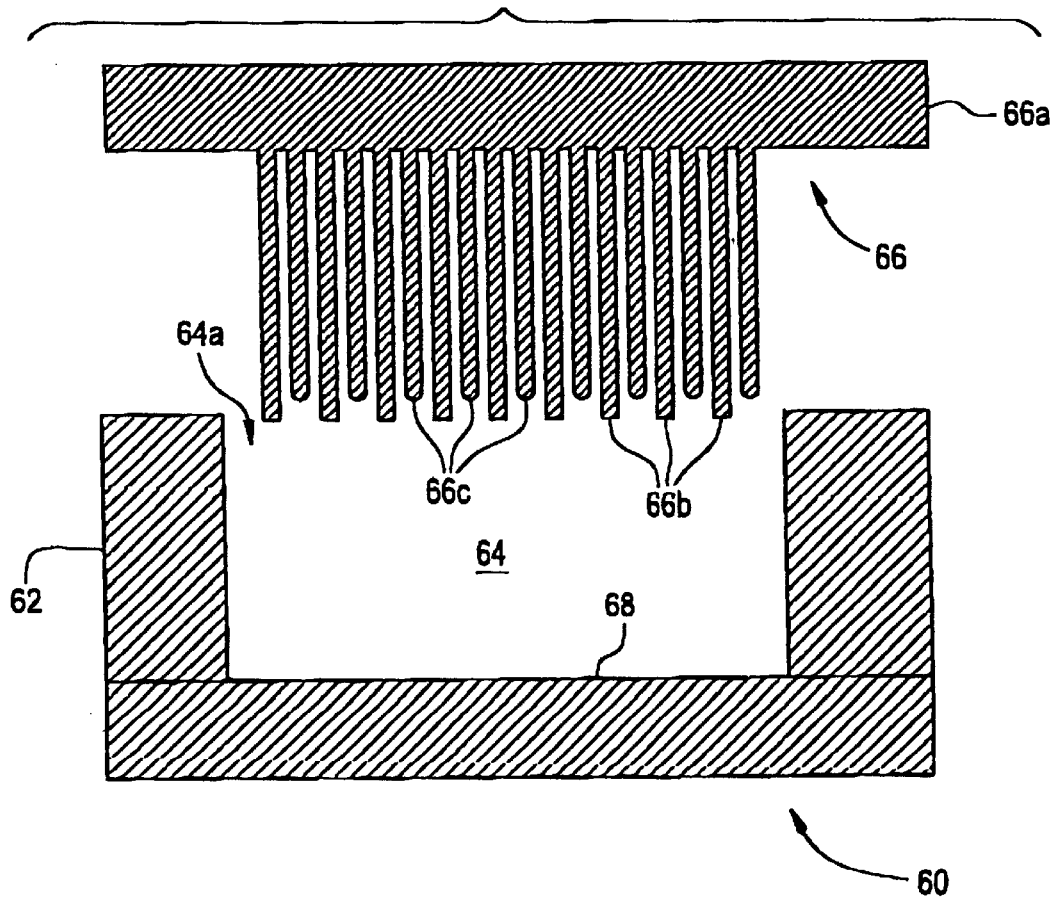
FIG. 8 schematically illustrates apparatus for the manufacture of the pressed element of FIG. 7.

The method for making a preform for a filter element such as shown in FIG. 7 of the drawing is analogous to the method used for pressing other preforms, and can be effected utilizing apparatus 60 such as schematically illustrated in FIG. 8 of the drawing. A charge of a plasticized powder batch material (not shown) is first loaded into a pressing chamber 64 including a top opening 64a, a side wall 62, and a bottom pressing surface 68, and a pressing element 66 comprising an array of protruding channel-forming members carried on a base plate 66a is introduced into the top opening and brought into contact with the batch charge. In this case, however, the channel-forming members include a first plurality of forming members 66b having a first length and a second plurality of forming members 66c having a second length less than the first length.

To shape the preform, the pressing element 66 is advanced into chamber 64 and through the batch material (not shown) to cause the first plurality of channel-forming members 66b to completely traverse the batch charge and come into contact with bottom pressing surface 68. This pressing step forms a first array of throughchannels (channels 52 in FIG. 7) in the batch charge, but the advance does not proceed far enough to permit the contact of second plurality of channel-forming members 66c with bottom pressing surface 68. Accordingly, a second array of closed-end channels (channels 54 in FIG. 7), shaped by the second plurality of shorter channel-forming members, is formed at the same time as the first channel array.

Following this forming step, the pressing element is withdrawn from the formed batch material and pressing chamber and the resulting honeycomb filter preform is removed from the press. If desired, a guide/stripper plate similar in design to that included in the apparatus of FIGS. 4–6 may be employed here also, to prevent the possible removal of batch material from the channel walls of the pressed structure during withdrawal of the pressing element.

As previously noted, honeycomb filter preforms provided in accordance with the invention will typically be subjected to further processing, to develop desirable levels of wall porosity in the competed filter. The nature of such further treatment will depend on the particular composition of the plasticized batch material used and the properties desired in the treated material, but is known for many batch materials, and/or may readily be determined by routine experiment. In some cases heating of the preform after ejection from the press is used to remove temporary binders and to fuse the powders used in forming the plasticized pressing material into an integral filter preform. The heating temperature used will depend on the nature of the reactions and/or sintering processes required to form an integral structure of the required porosity and chemical characteristics.

Where activated carbon or other active materials are included in the structure, relatively low temperatures and/or special atmospheres may be employed to retain high adsorption activity during the removal, or the chemical reaction with other species, of binder or binder precursor compounds present in the structure. Higher temperatures are normally used where the pressing material contains glass or ceramic particles which must be sintered to provide a rigid structure of the required porosity, or where other inorganic materials are present which must be reaction-sintered in order to form the glassy or crystalline phases desired in the final filter. The latter case is exemplified by the case of a porous cordierite filter such as may be produced by reaction-sintering a pressed preform shaped from a charge comprising a mixture of clay, talc and alumina.

Where the filter preform includes polymeric or other precursors such as used to develop an activated carbon phase for water treatment, a multi-stage post heat-treating process may be employed. Such processes conventionally include an initial carbonization step wherein the precursors are converted to carbon, and a later activation step wherein the carbon is activated.

We claim:

1. A method for making a channeled honeycomb filter preform which comprises the steps of:

introducing a charge of a plasticized powder batch material into a pressing chamber, the pressing chamber including a sidewall member and at least first and second opposing pressing elements, the pressing elements comprising, respectively, first and second base plates and first and second arrays of channel-forming members attached to and extending perpendicularly from the respective base plates;

bringing the sidewall member and opposing first and second pressing elements into contact with each other and with the charge of batch material to form a substantially closed pressing chamber wherein:

(i) the channel-forming members of the first pressing element extend from the first base plate toward the second base plate but are separated by a first space therefrom;

(ii) the channel-forming members of the second pressing element extend from the second base plate toward the first base plate but are separated by a second space therefrom; and (iii) the channel-forming members of the first base plate are generally parallel with but laterally offset from the channel-forming members of the second base plate;

thus to form the charge of batch material into a honeycomb filter preform incorporating opposing, overlapping arrays of channels separated by channel walls of the batch material, each channel having an open end and a closed end, the closed end being bounded by an end segment of the plasticized powder batch material continuous with the channel walls;

opening the pressing chamber, and removing the honeycomb filter preform from the chamber.

2. A method in accordance with claim 1 wherein the charge of plasticized powder batch material is a shaped charge of generally flattened configuration having opposing flattened surface segments defining a central portion and an adjoining edge portion, the edge portion at least partially encircling the central portion and having an average thickness greater than an average thickness of the central portion.

3. A method in accordance with claim 1 wherein a release coating is provided on the surfaces of the channel-forming members.

4. A method in accordance with claim 1 wherein at least some of the channel-forming members decrease in at least one cross-sectional dimension with increasing distance from the base plate.

5. A method in accordance with claim 1 wherein the end segments have a thickness of the same order of magnitude as the thickness of the channel walls.

6. A method in accordance with claim 1 wherein:

the first and second pressing elements further comprise, respectively, first and second stripper plates, each stripper plate comprising an array of perforations through which each array of channel-forming members extends from the base plate;

the sidewall member and opposing first and second stripper plates and arrays of channel-forming elements are brought into contact with each other and with the charge of batch material to form a substantially closed pressing chamber bounded by the sidewall member and the first and second stripper plates, such that:

(i) the channel-forming members of the first pressing element extend from the first base plate through the first stripper plate and into batch material toward the second stripper plate; and (ii) the channel-forming members of the second pressing element extend from the second base plate through the second stripper plate and into the batch material toward the first stripper plate;

thus to form the charge of batch material into a honeycomb filter preform incorporating opposing, overlapping arrays of closed-end channels; and prior to opening the chamber, the first and second pressing elements are retracted from the first and second stripper plates, with the arrays of channel-forming members thereby being withdrawn from the preform through the perforations in the stripper plates.

7. A method in accordance with claim 6 wherein the stripper plates restrict the removal of batch material from chamber as the channel-forming members are withdrawn from the preform.

* * * * *